US012462968B2

(12) United States Patent
Florendo et al.

(10) Patent No.: US 12,462,968 B2
(45) Date of Patent: Nov. 4, 2025

(54) SYSTEMS AND METHODS FOR UNIFORM COOLING OF ELECTROMAGNETIC COIL

(71) Applicant: KLA Corporation, Milpitas, CA (US)

(72) Inventors: Oscar Florendo, Hollister, CA (US); Vincent Nguyen, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 977 days.

(21) Appl. No.: 17/568,215

(22) Filed: Jan. 4, 2022

(65) Prior Publication Data

US 2023/0133576 A1 May 4, 2023

Related U.S. Application Data

(60) Provisional application No. 63/273,155, filed on Oct. 29, 2021.

(51) Int. Cl.
*H01F 27/00* (2006.01)
*H01F 27/10* (2006.01)
*H01F 27/28* (2006.01)

(52) U.S. Cl.
CPC ....... *H01F 27/2876* (2013.01); *H01F 27/105* (2013.01)

(58) Field of Classification Search
CPC ...... H01F 27/2876; H01F 27/105; H01F 7/20; H01J 2237/002; H01J 37/141
USPC .......................................... 250/492.3, 493 R
See application file for complete search history.

(56) References Cited

U.S. PATENT DOCUMENTS

2003/0136923 A1* 7/2003 Watson ............... H01J 37/3174 250/492.3
2007/0085019 A1 4/2007 Jasinski et al.
2008/0224062 A1 9/2008 Adamec
2017/0213689 A1 7/2017 Abe et al.

FOREIGN PATENT DOCUMENTS

JP 2009278001 A 11/2009
JP 20158078 A * 1/2015
JP 2015008078 A 1/2015

OTHER PUBLICATIONS

WIPO, International Search Report for International Application No. PCT/US2022/047782, Feb. 16, 2023.
WIPO, Written Opinion of the International Searching Authority for International Application No. PCT/US2022/047782, Feb. 16, 2023.

* cited by examiner

*Primary Examiner* — Michael Maskell
(74) *Attorney, Agent, or Firm* — Hodgson Russ LLP

(57) ABSTRACT

A system and method for uniform cooling of an electromagnetic coil are provided. The system includes an electromagnetic coil, a cooling structure, and a cooling fluid source. The cooling structure surrounds the entirety of the perimeter of the electromagnetic coil, and includes a first cooling channel and a second cooling channel arranged alternately about the electromagnetic coil. The cooling fluid source is configured to deliver a first cooling fluid to the first cooling channel and a second cooling fluid to the second cooling channel, such that the first cooling fluid and the second cooling fluid cool the electromagnetic coil.

18 Claims, 6 Drawing Sheets

SYSTEMS AND METHODS FOR UNIFORM COOLING OF ELECTROMAGNETIC COIL

CROSS-REFERENCE TO RELATED APPLICATIONS

This application claims priority to the provisional patent application filed Oct. 29, 2021 and assigned U.S. App. No. 63/273,155, the disclosure of which is hereby incorporated by reference.

FIELD OF THE DISCLOSURE

This disclosure relates to electron beam systems and, more particularly, to cooling systems for electromagnetic coils.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer or an EUV mask using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer that are separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

In electron beam systems, one or more elements may be placed in the electron beam path to focus the beam toward a target. For example, the beam may pass through an electromagnetic coil. When the coil is powered on, a resulting magnetic field in the aperture of the coil focuses passing electrons into a narrow beam. However, powering the coil also generates heat in coil. When heat is transferred to the housing surrounding the coil and to other optical components in the system, it can change of alignment and symmetry due to thermal expansion of the components. This can result in loss of calibration, image distortion, and drift.

Existing methods seek to reduce heat transfer from the coil to other components by cooling the coil. For example, a copper plate brazed with copper tubes may be bonded to the coil, and a cooling fluid may be pumped through the tubes to cool the copper plate and thereby cool the coil. However, these methods result in non-uniform cooling of the coil because: (1) the copper plate is only disposed on one side of the coil (i.e., the side of the coil closest to the copper plate is cooler than the side farthest from the copper plate); and (2) the temperature of the cooling fluid at the outlet is greater than the temperature at the inlet (i.e., the portion of the coil near the inlet is cooler than the portion near the outlet). Non-uniform cooling may be less effective at reducing heat transfer to the housing and mitigating adverse effects on the system.

Therefore, what is needed is an improved method of cooling an electromagnetic coil.

BRIEF SUMMARY OF THE DISCLOSURE

An embodiment of the present disclosure provides a system. The system may comprise an electromagnetic coil, a cooling structure, and a cooling fluid source. The cooling structure may surround the entirety of the perimeter of the electromagnetic coil. The cooling structure may comprise a first cooling channel and a second cooling channel arranged alternately about the electromagnetic coil. The cooling fluid source may be configured to deliver a first cooling fluid to the first cooling channel. The cooling fluid source may be configured to deliver a second cooling fluid to the second cooling channel. The first cooling fluid and the second cooling fluid may cool the electromagnetic coil.

According to an embodiment of the present disclosure, the system may further comprise an electron beam source. The electron beam source may be configured to generate an electron beam. The electron beam may be directed through an aperture of the electromagnetic coil toward a target. The system may further comprise a voltage source. The voltage source may be configured to power the electromagnetic coil, which may generate an electromagnetic field in the aperture and may focus the electron beam passing through the aperture.

According to an embodiment of the present disclosure, the first cooling channel and the second cooling channel may be defined by separate tubing circuits wrapped around the entirety of the perimeter of the electromagnetic coil.

According to an embodiment of the present disclosure, the first cooling channel and the second cooling channel may be defined by separate channel circuits in an integrated solid structure surrounding the entirety of the perimeter of the electromagnetic coil.

According to an embodiment of the present disclosure, the electromagnetic coil may have a ring shape comprising a top surface, a bottom surface, an inner surface, and an outer surface. The cooling structure may be disposed on each of the top surface, the bottom surface, the inner surface, and the outer surface.

According to an embodiment of the present disclosure, the first cooling channel and the second cooling channel may be arranged alternately about each surface of the electromagnetic coil in a single layer.

According to an embodiment of the present disclosure, the cooling structure may further comprise a first inlet and a first outlet in fluid communication with the first cooling channel. The cooling structure may further comprise a second inlet and a second outlet in fluid communication with the second cooling channel. The first inlet may be disposed adjacent to the second outlet. The second inlet may be disposed adjacent to the first outlet.

According to an embodiment of the present disclosure, the first cooling fluid may travel through the first cooling channel in a first direction and the second cooling fluid may travel through the second cooling channel in a second direction. The second direction may be opposite to the first direction.

According to an embodiment of the present disclosure, the cooling fluid source may comprise water.

According to an embodiment of the present disclosure, the first cooling channel and the second cooling channel may have the same cross-sectional area and effective length.

According to an embodiment of the present disclosure, the cooling structure may encase the electromagnetic coil.

According to an embodiment of the present disclosure, the electromagnetic coil and the cooling structure may be disposed within a housing.

An embodiment of the present disclosure provides a method. The method may comprise powering, via a voltage source, an electromagnetic coil. The method may further comprise delivering, via a cooling fluid source, a first cooling fluid and a second cooling fluid to a cooling structure surrounding the entirety of the perimeter of the electromagnetic coil. The cooling structure may comprise a first cooling channel and a second cooling channel arranged alternately about the electromagnetic coil. The first cooling fluid may be delivered to the first cooling channel. The second cooling fluid may be delivered to the second cooling channel. The first cooling fluid and the second cooling fluid may uniformly cool the electromagnetic coil.

According to an embodiment of the present disclosure, the method may further comprise generating, via an electron beam source, an electron beam. The method may further comprise directing the electron beam through an aperture of the electromagnetic coil toward a target. An electromagnetic field generated by the electromagnetic coil may focus the electron beam passing through the aperture.

According to an embodiment of the present disclosure, the method may further comprise delivering, via a first inlet, the first cooling fluid to the first cooling channel. The first cooling fluid may exist the first cooling channel at a first outlet. The method may further comprise delivering, via a second inlet, the second cooling fluid to the second cooling channel. The second cooling fluid may exit the second cooling channel at a second outlet. The first inlet may be disposed in the cooling structure adjacent to the second outlet, and the second inlet may be disposed in the cooling structure adjacent to the first outlet.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Figure 1A:
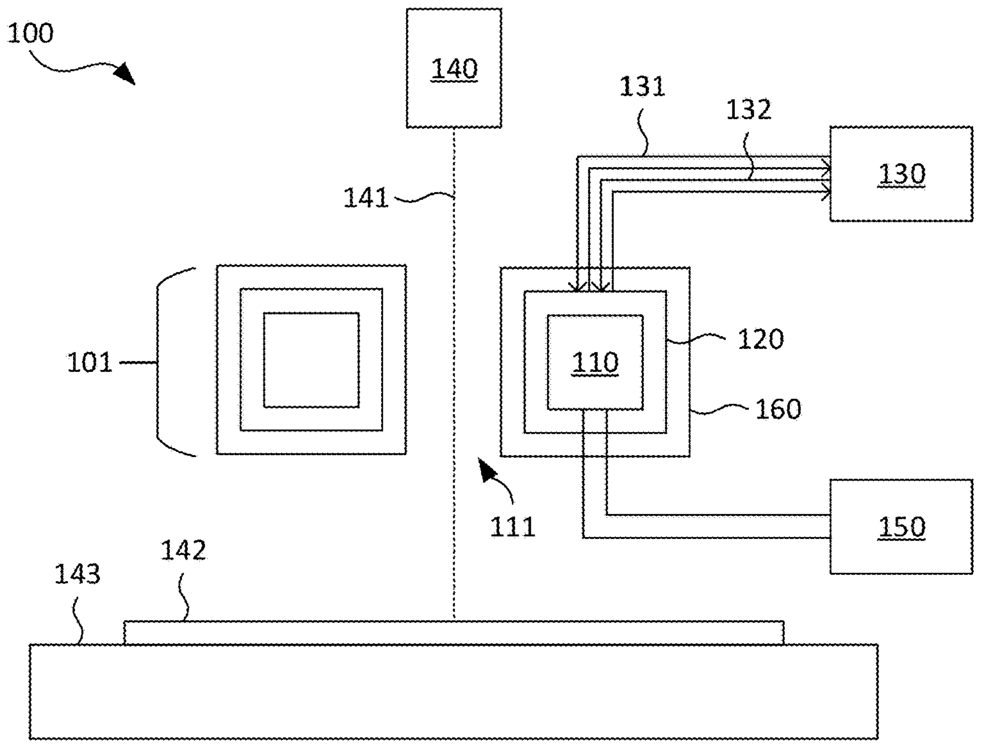
FIG. 1A is a cross-sectional block diagram of an apparatus according to an embodiment of the present disclosure.
Figure 1B:
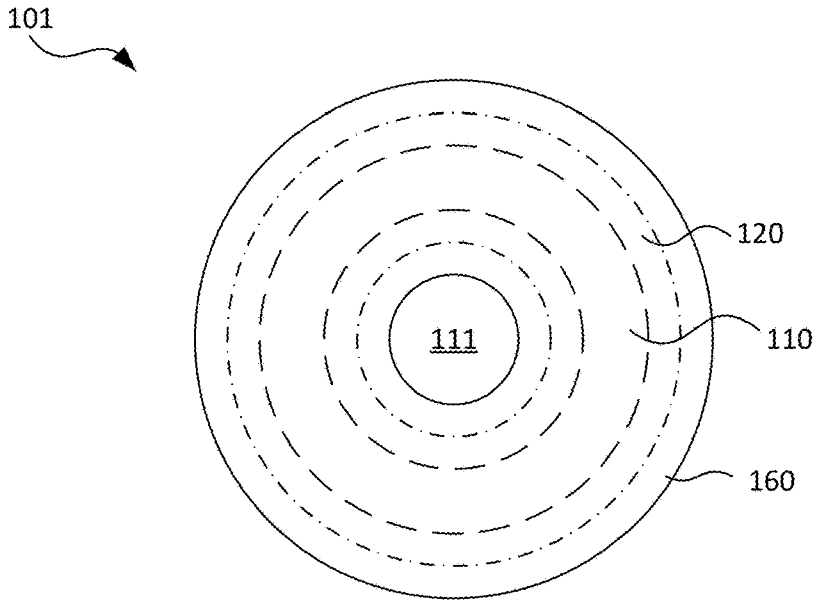
FIG. 1B is a top view of a coil assembly according to an embodiment of the present disclosure.

As shown in FIG. 1A, an embodiment of the present disclosure provides an apparatus 100. The apparatus 100 may comprise an electromagnetic coil 110. The electromagnetic coil 110 may have a ring shape (shown in FIG. 1B), defining an aperture 111. When connected to a voltage source 150, an electromagnetic field may be generated in the aperture 111. The strength of the electromagnetic field may be controlled by the voltage source 150 by adjusting the voltage or current applied to the electromagnetic coil 110. For example, the voltage source 150 may supply a power of 120 to 300 watts to the electromagnetic coil 110. In a particular example, the power may be 160 watts. When connected to a voltage source 150, the electromagnetic coil may 110 also generate heat. For example, the temperature of the electromagnetic coil 110 may be up to 110° C. In some examples, the temperature of the electromagnetic coil 110 may be up to 300° C., depending on the type of wire used.

The apparatus 100 may further comprise an electron beam source 140. The electron beam source 140 configured to generate an electron beam 141. The electron beam 141 may be directed through the aperture 111 of the electromagnetic coil 110 toward a target 142. The target 142 may be disposed on a stage 143. When the electron beam 141 passes through the aperture 111, the electromagnetic field generated by the electromagnetic coil 110 may focus the electron beam 141. When performing inspection processes, the electron beam source 140 and the voltage source 150 may cooperate to power the electromagnetic coil 110 and improve accuracy of the measurements of the target 142 by focusing the beam 141.

The apparatus 100 may further comprise a cooling structure 120. The cooling structure 120 may surround the entirety of the perimeter of the electromagnetic coil 110. The cooling structure 120 may include a first cooling channel 121 and a second cooling channel 122.

The apparatus 100 may further comprise a cooling fluid source 130. The cooling fluid source 130 may be configured to deliver a first cooling fluid 131 to the first cooling channel 121. The cooling fluid source 130 may also be configured to deliver a second cooling fluid 132 to the second cooling channel 122. In an instance, the first cooling fluid 131 and the second cooling fluid 132 may be the same. By delivering the first cooling fluid 131 and the second cooling fluid 132 to the cooling structure 120, the electromagnetic coil 110 may be cooled to prevent heat transfer to other components. The cooling fluid source 130 may comprise water, mixtures of water with other liquids (e.g., ethylene glycol) a fluorinated liquid (e.g. FLUORINERT™ FC-77), or other refrigerants. For example, the cooling fluid source 130 may comprise water at a temperature of 15 to 25° C. If the temperature of the cooling fluid is too high (e.g., greater than 25° C.), the temperature of the electromagnetic coil 110 may exceed the maximum temperature of the wire, causing damage to the electromagnetic coil 110. If the temperature of the cooling fluid is too low (e.g., less than 15° C.), the coolant plumbing connected to the cooling fluid source 130 may cause water vapor in the work environment to condense. Accumulation of condensate may cause electrical shorts in parts of the tool. The cooling fluid source 130 may deliver the first cooling fluid 131 and the second cooling fluid 132 at a rate of 0.3 to 1.0 L/min. For example, the rate may be 0.5 L/min. The rate of delivery may be controlled by a controllable fluid pump. The rate may be dependent on the size of the tubing and the required heat dissipation. When the rate is too high (e.g., greater than 1.0 L/min), turbulent flow may occur, which may cause vibrations in the tool, thereby degrading images produced by the tool. In an instance, the cooling fluid source 130 may include a single reservoir configured to deliver the first cooling fluid 131 and the second cooling fluid 132 to the cooling structure 120. In another instance, the cooling fluid source 130 may include separate reservoirs configured to deliver the first cooling fluid 131 and the second cooling fluid 132 to the cooling structure 120.

Figure 2:
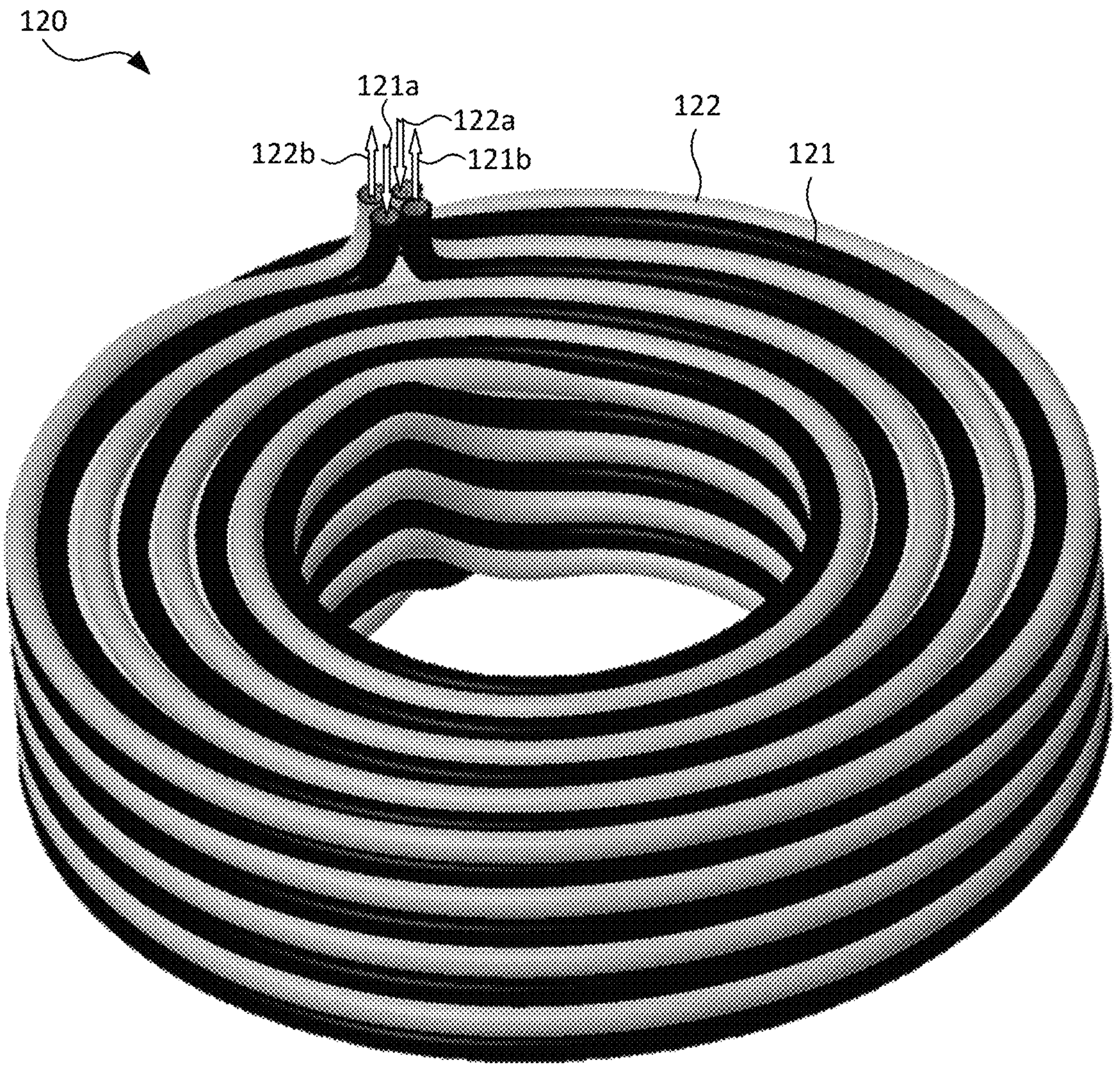
FIG. 2 is a perspective view of a cooling structure according to an embodiment of the present disclosure.

As shown in FIG. 2, the cooling structure 120 may encase the electromagnetic coil 110. For example, the cooling structure 120 may cover all surfaces of the electromagnetic coil 110. Compared to existing designs which only cool one surface of the electromagnetic coil 110, the cooling structure 120 may provide more uniform cooling to the electromagnetic coil 110.

Figure 3A:
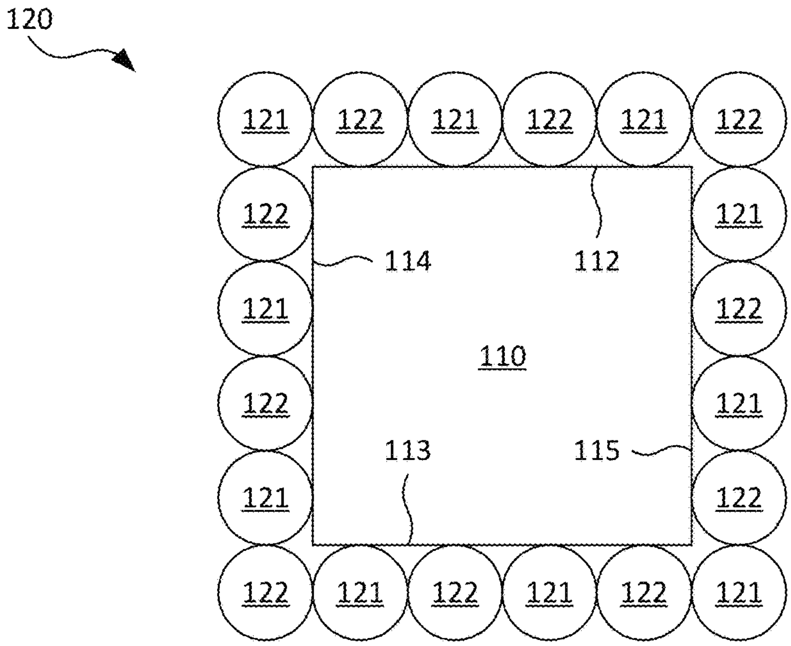
FIG. 3A is a cross-sectional view of a cooling structure according to an embodiment of the present disclosure.

In an embodiment shown in FIG. 3A, the cooling structure 120 may include separate tubing circuits which define the first cooling channel 121 and the second cooling channel 122. The tubing circuits may be a flexible material, such as plastic, which are wrapped around the entirety of the perimeter of the electromagnetic coil 110. Flexible tubing circuits may be able to thermally expand with less stress compared to other materials. Plastic or other insulating materials may provide better isolation of heat generated by the electromagnetic coil 110. The tubing circuits may also be metal or other materials.

Figure 3B:
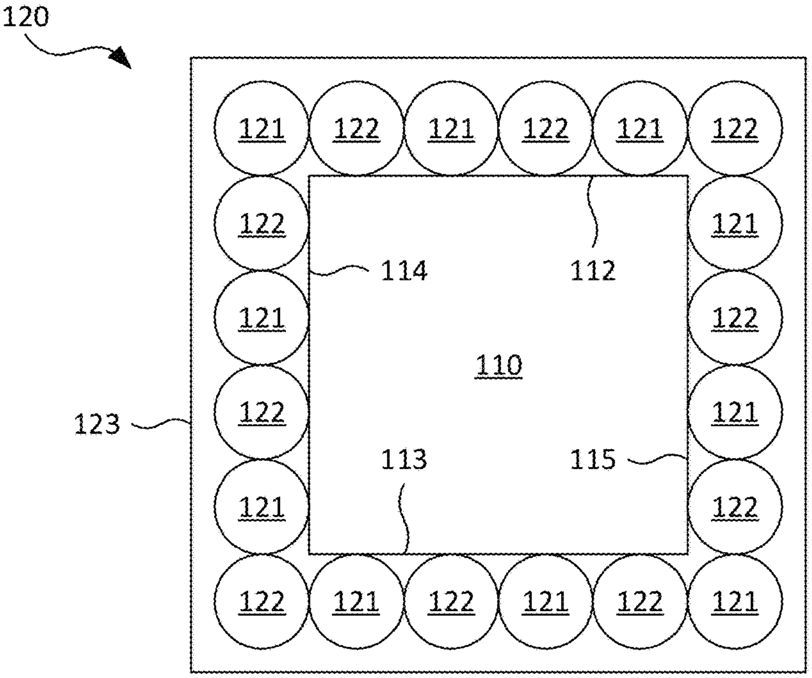
FIG. 3B is a cross-sectional view of a cooling structure according to another embodiment of the present disclosure.

In an embodiment shown in FIG. 3B, the cooling structure 120 may include an integrated solid structure 123, in which the first cooling channel 121 and the second cooling channel 122 are defined. The integrated solid structure 123 may be a 3D-printed structure which surrounds the entirety of the perimeter of the electromagnetic coil 110. The integrated solid structure 123 may be metal, plastic, or other materials. The integrated solid structure 123 may be fabricated in two or more parts which, when assembled, surround the electromagnetic coil 110.

As shown in FIGS. 3A and 3B, the electromagnetic coil 110 may include a top surface 112, a bottom surface 113, an inner surface 114, and an outer surface 115. The cooling structure 120 may be disposed on each side of the electromagnetic coil 110. For example, the first cooling channel 121 and the second cooling channel 122 may be disposed on each of the top surface 112, the bottom surface 113, the inner surface 114, and the outer surface 115 of the electromagnetic coil 110. The inner surface 114 may be more proximate the electron beam 141 in FIG. 1 than the outer surface 115. In some embodiments, the cooling structure 120 may be disposed on only some sides of the electromagnetic coil 110. For example, the first cooling channel 121 and the second cooling channel 122 may be disposed on the top surface 112, the bottom surface 113, and the outer surface 115 of the electromagnetic coil 110.

The first cooling channel 121 and the second cooling channel 122 may define a single layer. In some embodiments, the first cooling channel 121 and the second cooling channel 122 may define multiple layers. The first cooling channel 121 and the second cooling channel 122 may be arranged alternately. For example, each portion of the first cooling channel 121 may be disposed between two portions of the second cooling channel 122. In this way, the first cooling channel 121 and the second cooling channel 122 may be arranged side-by-side as they are wrapped around the entirety of the perimeter of the electromagnetic coil 110.

Referring to FIG. 2, the cooling structure 120 may further comprise a first inlet 121*a* and a first outlet 121*b* in fluid communication with the first cooling channel 121. The first cooling fluid 131 may be delivered to the first cooling channel 121 via the first inlet 121*a*. The first cooling fluid 131 may exit the first cooling channel 121 via the first outlet 121*b*. The travel distance of the first cooling fluid 131 in the first cooling channel 121 from the first inlet 121*a* to the first outlet 121*b* may define an effective length of the first cooling channel 121.

The cooling structure 120 may further comprise a second inlet 122*a* and a second outlet 122*b* in fluid communication with the second cooling channel 122. The second cooling fluid 132 may be delivered to the second cooling channel 122 via the second inlet 122*a*. The second cooling fluid 132 may exit the second cooling channel 122 via the second outlet 122*b*. The travel distance of the second cooling fluid 132 in the second cooling channel 122 from the second inlet 122*a* to the second outlet 122*b* may define an effective length of the second cooling channel 122.

According to an embodiment of the present disclosure, the effective length of the first cooling channel 121 and the effective length of the second cooling channel 122 may be the same. The cross-sectional area of the first cooling channel 121 and the cross-sectional area of the second cooling channel 122 may be the same. For example, the first cooling channel 121 and the second cooling channel 122 may have an inner diameter of 2.5 to 5 mm. In a particular example, the inner diameter may be 3.0 mm. The diameter may depend on the available space for the electromagnetic coil 110 and the heat that needs to be dissipated. With the first cooling channel 121 and the second cooling channel 122 having the same cross-sectional area and effective length, cooling of the electromagnetic coil 110 with the first cooling fluid 131 and the second cooling fluid 132 may be similar, thereby more uniformly cooling the electromagnetic coil 110 compared to existing designs.

Figure 4A:
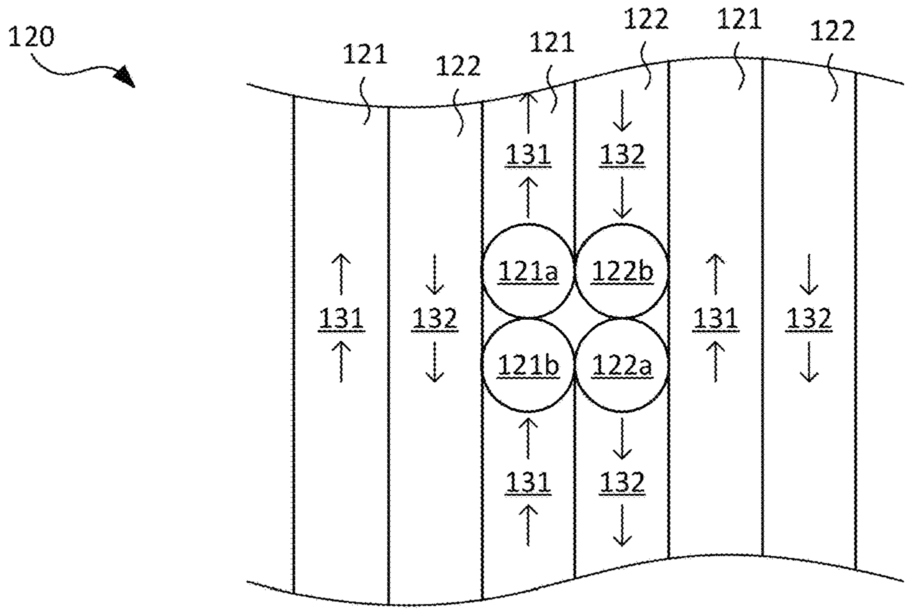
FIG. 4A a top view of a cooling structure according to an embodiment of the present disclosure.

The first inlet 121*a* may be disposed adjacent to the second outlet 122*b*, and the second inlet 122*a* may be disposed adjacent to the first outlet 121*b*. For example, as shown in FIG. 4A, the first inlet 121*a*, the first outlet 121*b*, the second inlet 122*a*, and the second outlet 122*b* may be arranged in a cluster in the cooling structure 120. The cluster may be arranged on any side of the electromagnetic coil 110. For example, the cluster may be arranged on the top surface 112, the bottom surface 113, the inner surface 114, or the outer surface 115 of the electromagnetic coil 110. It can be understood that the temperature of the first cooling fluid 131 may increase as it travels through the first cooling channel 121, and the temperature of the second cooling fluid 132 may increase as it travels through the second cooling channel 122 as heat is transferred from the electromagnetic coil. Thus, by arranging the first inlet 121*a* adjacent to the second outlet 122*b* and the second inlet 122*a* adjacent to the first outlet 121*b*, the cooling structure 120 may more uniformly cool the electromagnetic coil 110 compared to existing designs.

Figure 4B:
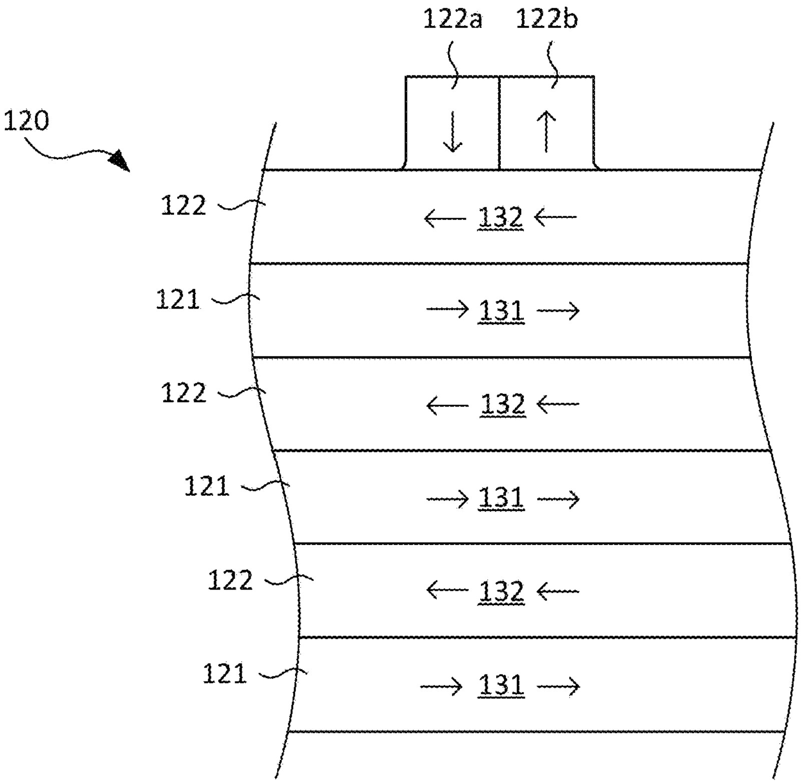
FIG. 4B is a side view of a cooling structure according to an embodiment of the present disclosure.

The first cooling fluid 131 may travel through the first cooling channel 121 in a first direction. The second cooling fluid 132 may travel through the second cooling channel 122 in a second direction. As shown in FIGS. 4A and 4B, the first direction may be opposite to the second direction. The cooling fluid source 130 may deliver the first cooling fluid 131 and the second cooling fluid 132 at similar or different rates. By delivering the first cooling fluid 131 and the second cooling fluid 132 in opposite directions, the cooling structure 120 may more uniformly cool the electromagnetic coil 110 compared to existing designs.

The apparatus 100 may further comprise a housing 160. The electromagnetic coil 110 and the cooling structure 120 may be disposed within the housing 160 to define a coil assembly 101, shown in cross-sectional view in FIG. 1A and in top view in FIG. 1B. The coil assembly 101 may be used as a gun lens, an objective lens, or another optical component in an electron beam system. A thermally-conductive potting compound may be filled in the coil assembly 101 between the electromagnetic coil 110 and the cooling structure 120. The thermally-conductive potting compound may facilitate heat transfer from the electromagnetic coil 110 to the cooling structure 120. In some implementations, a thermally-insulating potting compound may be filled in the coil assembly 101 between the cooling structure 120 and the housing 160. The thermally-insulating potting compound may reduce heat transfer between the cooling structure 120 and the housing 160. Using these two types of potting compound may be beneficial for applications that need to minimize heat transfer to the housing 160. With the coil assembly 101, the cooling structure 120 may uniformly cool the electromagnetic coil 110 and may insulate the housing 160 from heat generated by the coil 110. For example, the temperature of the housing 160 may vary by 3° C. or less when the electromagnetic coil 110 is powered on using the cooling structure 120. In an instance, the temperature of the housing 160 may vary by 0.2° C. or less when the electromagnetic coil 110 is powered on using the cooling structure 120. For some temperature-sensitive applications, the housing temperature variation may be ±0.1° C. For less demanding applications, the housing temperature variation may be ±1.0° C. Thus, the coil assembly 101 may reduce heat transfer to other components of the apparatus 100, resulting in improved alignment and symmetry, which may require less frequent calibration and may prevent image distortion and drift.

With the apparatus 100, more uniform cooling of the electromagnetic coil 110 may be achieved compared to existing designs due to the delivery of the first cooling fluid 131 and the second cooling fluid 132 to the cooling structure 120 surrounding the entirety of the perimeter of the electromagnetic coil 110.

Figure 5A:
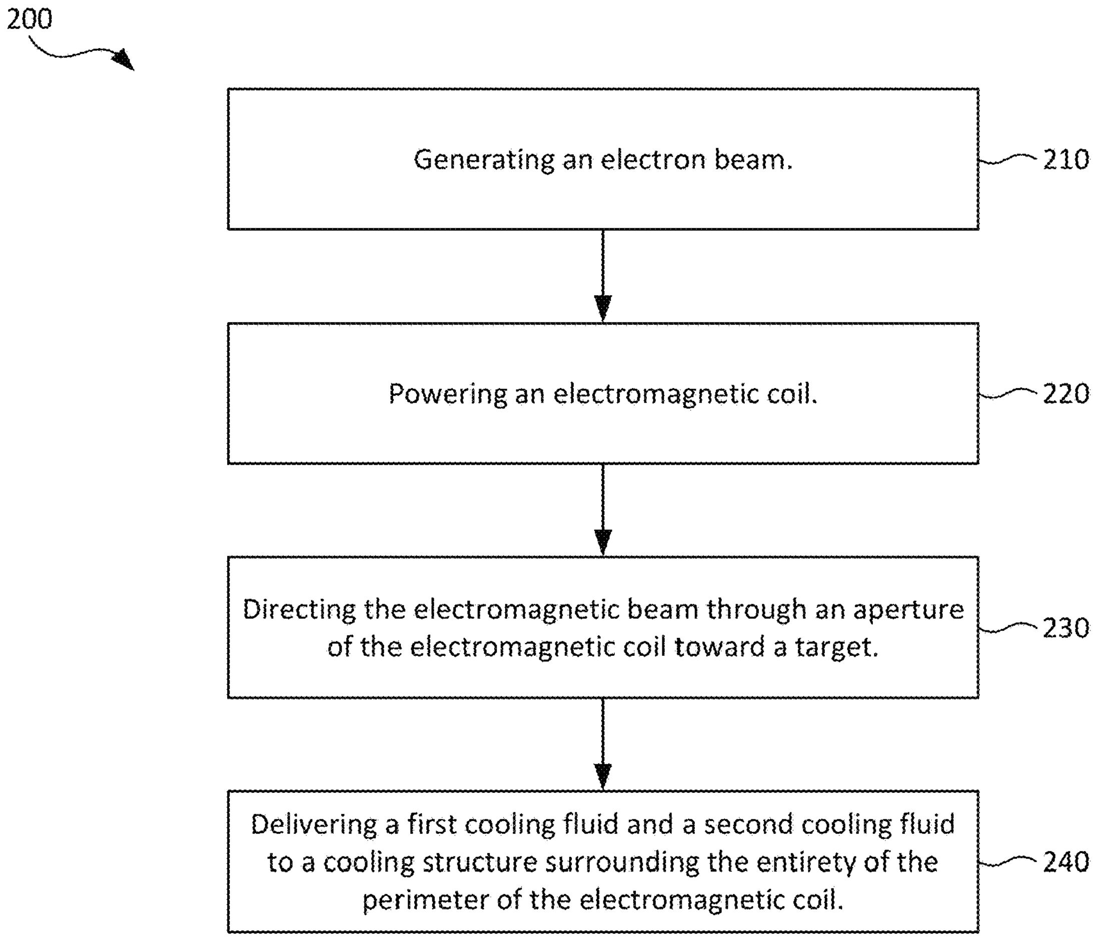
FIG. 5A is a flow chart of a method according to an embodiment of the present disclosure.

Another embodiment of the present disclosure provides a method 200. The method may be performed using the apparatus 100. As shown in FIG. 5A, the method may comprise the following steps.

At step 210, an electron beam is generated. The electron beam may be generated by an electron beam source, such as a cathode source or an emitter tip.

At step 220, an electromagnetic coil is powered. The electromagnetic coil may have a ring shape, defining an aperture. The electromagnetic coil may include a top surface, a bottom surface, an inner surface, and an outer surface. The electromagnetic coil may be powered by a voltage source. Powering the electromagnetic coil may generate an electromagnetic field in the aperture of the electromagnetic coil. Powering the electromagnetic coil may also generate heat. When performing inspection processes, the powered supplied by the voltage source may differ depending on the application and system parameters.

At step 230, the electron beam is directed through the aperture of the electromagnetic coil toward a target. The target may be disposed on a stage. The electromagnetic field in the aperture of the electromagnetic coil may focus the electron beam toward the target. Focusing the electron beam toward the target may improve accuracy of measurements.

At step 240, a first cooling fluid and a second cooling fluid are delivered to a cooling structure surrounding the entirety of the perimeter of the electromagnetic coil. The first cooling fluid and the second cooling fluid may be delivered by a cooling fluid source. The first cooling fluid and the second cooling fluid may be water. The cooling structure may include a first cooling channel and a second cooling channel. By delivering the first cooling fluid and the second cooling fluid to the cooling structure, the electromagnetic coil may be cooled to prevent heat transfer to other components.

The cooling structure may encase the electromagnetic coil. For example, the cooling structure may cover all surfaces of the electromagnetic coil, including the top surface, the bottom surface, the inner surface, and the outer surface of the electromagnetic coil. Compared to existing designs which only cool one surface of the electromagnetic coil, the cooling structure may provide more uniform cooling to the electromagnetic coil.

In an instance, the cooling structure may include separate tubing circuits which define the first cooling channel and the second cooling channel. The tubing circuits may be a flexible material, such as plastic, which are wrapped around the entirety of the perimeter of the electromagnetic coil. Flexible tubing circuits may be able to thermally expand with less stress compared to other materials. Plastic or other insulating materials may provide better isolation of heat generated by the electromagnetic coil. The tubing circuits may also be metal or other materials.

In an instance, the cooling structure may include an integrated solid structure, in which the first cooling channel and the second cooling channel are defined. The integrated solid structure may be a 3D-printed structure which surrounds the entirety of the perimeter of the electromagnetic coil. The integrated solid structure may be metal, plastic, or other materials. The integrated solid structure may be fabricated in two or more parts which, when assembled, surround the electromagnetic coil.

The first cooling channel and the second cooling channel may define a single layer. In some embodiments, the first cooling channel and the second cooling channel may define multiple layers. The first cooling channel and the second cooling channel may be arranged alternately. For example, each portion of the first cooling channel may be disposed between two portions of the second cooling channel. In this way, the first cooling channel and the second cooling channel may be arranged side-by-side as they are wrapped around the entirety of the perimeter of the electromagnetic coil.

Figure 5B:
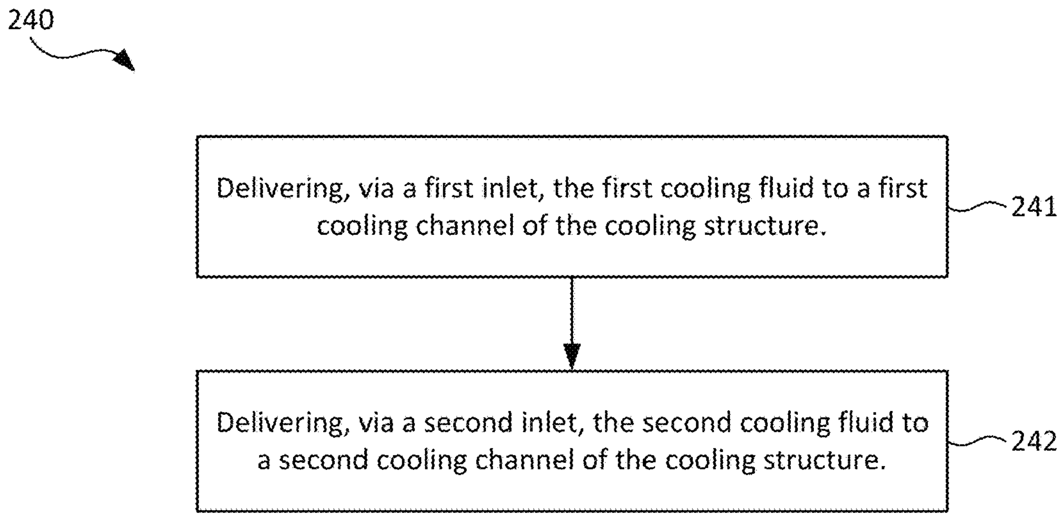
FIG. 5B is a flow chart of a method according to another embodiment of the present disclosure.

Referring to FIG. 5B, step 240 make comprise the following steps (performed in any order or simultaneously).

At step 241, the first cooling fluid is delivered via a first inlet to the first cooling channel of the cooling structure. The first cooling fluid may exit the first cooling channel via a first outlet. The travel distance of the first cooling fluid in the first cooling channel from the first inlet to the first outlet may define an effective length of the first cooling channel.

At step 242, the second cooling fluid is delivered via a second inlet to the second cooling channel of the cooling structure. The second cooling fluid may exit the second cooling channel via a second outlet. The travel distance of the second cooling fluid in the second cooling channel from the second inlet to the second outlet may define an effective length of the second cooling channel.

The effective length of the first cooling channel and the effective length of the second cooling channel may be the same. The cross-sectional area of the first cooling channel and the cross-sectional area of the second cooling channel may be the same. With the first cooling channel and the second cooling channel having the same cross-sectional area and effective length, cooling of the electromagnetic coil with the first cooling fluid and the second cooling fluid may be similar, thereby more uniformly cooling the electromagnetic coil compared to existing designs.

The first inlet may be disposed adjacent to the second outlet, and the second inlet may be disposed adjacent to the first outlet. For example, the first inlet, the first outlet, the second inlet, and the second outlet may be arranged in a cluster in the cooling structure. The cluster may be arranged on any side of the electromagnetic coil. For example, the cluster may be arranged on the top surface, the bottom surface, the inner surface, or the outer surface of the electromagnetic coil. It can be understood that the temperature of the first cooling fluid may increase as it travels through the first cooling channel, and the temperature of the second cooling fluid may increase as it travels through the second cooling channel. Thus, by arranging the first inlet adjacent to the second outlet and the second inlet adjacent to the first outlet, the cooling structure may more uniformly cool the electromagnetic coil compared to existing designs.

The first cooling fluid may travel through the first cooling channel in a first direction. The second cooling fluid may travel through the second cooling channel in a second direction. The first direction may be opposite to the second direction. The cooling fluid source may deliver the first cooling fluid and the second cooling fluid at similar or different rates. By delivering the first cooling fluid and the second cooling fluid in opposite directions, the cooling structure may more uniformly cool the electromagnetic coil compared to existing designs.

With the method 200, more uniform cooling of the electromagnetic coil may be achieved compared to existing designs due to the delivery of the first cooling fluid and the second cooling fluid to the cooling structure surrounding the entirety of the perimeter of the electromagnetic coil.

Figure 6:
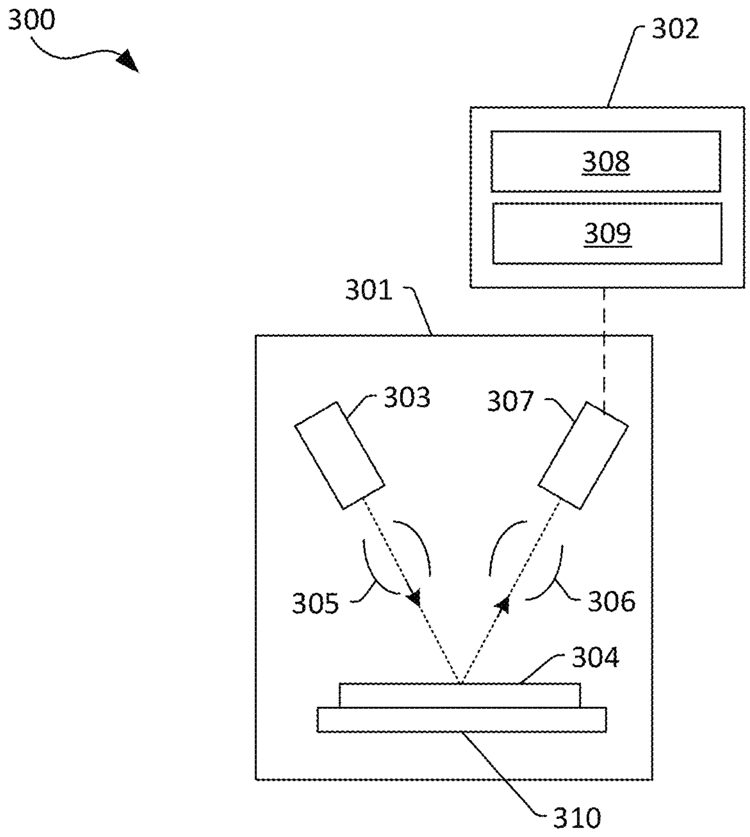
FIG. 6 is a block diagram of a system according to an embodiment of the present disclosure.

Another embodiment of the present disclosure provides a system 300. As shown in FIG. 6, the system 300 includes a wafer inspection tool (which includes the electron column 301) configured to generate images of a wafer 304.

The wafer inspection tool includes an output acquisition subsystem that includes at least an energy source and a detector. The output acquisition subsystem may be an electron beam-based output acquisition subsystem. For example, in one embodiment, the energy directed to the wafer 304 includes electrons, and the energy detected from the wafer 304 includes electrons. In this manner, the energy source may be an electron beam source. In one such embodiment shown in FIG. 6, the output acquisition subsystem includes electron column 301, which is coupled to computer subsystem 302. A stage 310 may hold the wafer 304.

As also shown in FIG. 6, the electron column 301 includes an electron beam source 303 configured to generate electrons that are focused to wafer 304 by one or more elements 305. The electron beam source 303 may include, for example, a cathode source or emitter tip. The one or more elements 305 may include, for example, a gun lens, an anode, a beam limiting aperture, a gate valve, a beam current selection aperture, an objective lens, and a scanning subsystem, all of which may include any such suitable elements known in the art. In particular, the one or more elements 305 may include the electromagnetic coil 110 and the cooling structure 120.

Electrons returned from the wafer 304 (e.g., secondary electrons) may be focused by one or more elements 306 to detector 307. One or more elements 306 may include, for example, a scanning subsystem, which may be the same scanning subsystem included in element(s) 305.

The electron column 301 also may include any other suitable elements known in the art.

Although the electron column 301 is shown in FIG. 6 as being configured such that the electrons are directed to the wafer 304 at an oblique angle of incidence and are scattered from the wafer 304 at another oblique angle, the electron beam may be directed to and scattered from the wafer 304 at any suitable angles. In addition, the electron beam-based output acquisition subsystem may be configured to use multiple modes to generate images of the wafer 304 (e.g., with different illumination angles, collection angles, etc.). The multiple modes of the electron beam-based output acquisition subsystem may be different in any image generation parameters of the output acquisition subsystem.

Computer subsystem 302 may be coupled to detector 307 as described above. The detector 307 may detect electrons returned from the surface of the wafer 304 thereby forming electron beam images of the wafer 304. The electron beam images may include any suitable electron beam images. Computer subsystem 302 may be configured to perform any of the functions described herein using the output of the detector 307 and/or the electron beam images. Computer subsystem 302 may be configured to perform any additional step(s) described herein. A system 300 that includes the output acquisition subsystem shown in FIG. 6 may be further configured as described herein.

It is noted that FIG. 6 is provided herein to generally illustrate a configuration of an electron beam-based output acquisition subsystem that may be used in the embodiments described herein. The electron beam-based output acquisition subsystem configuration described herein may be altered to optimize the performance of the output acquisition subsystem as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

Although the system 300 is described above as being an electron beam system, embodiments disclosed herein also can be used in an ion beam system. Such system may be configured as shown in FIG. 6 except that the electron beam source may be replaced with any suitable ion beam source known in the art. In addition, the embodiments disclosed herein may be any other suitable ion beam-based systems such as those included in commercially available focused ion beam (FIB) systems, helium ion microscopy (HIM) systems, and secondary ion mass spectroscopy (SIMS) systems.

The computer subsystem 302 includes a processor 308 and an electronic data storage unit 309. The processor 308 may include a microprocessor, a microcontroller, or other devices.

The computer subsystem 302 may be coupled to the components of the system 300 in any suitable manner (e.g., via one or more transmission media, which may include wired and/or wireless transmission media) such that the processor 308 can receive output. The processor 308 may be configured to perform a number of functions using the output. The wafer inspection tool can receive instructions or other information from the processor 308. The processor 308 and/or the electronic data storage unit 309 optionally may be in electronic communication with another wafer inspection tool, a wafer metrology tool, or a wafer review tool (not illustrated) to receive additional information or send instructions.

The processor 308 is in electronic communication with the wafer inspection tool, such as the detector 307. The processor 308 may be configured to process images generated using measurements from the detector 307. For example, the processor may perform embodiments of the method 200.

The computer subsystem 302, other system(s), or other subsystem(s) described herein may be part of various systems, including a personal computer system, image computer, mainframe computer system, workstation, network appliance, interne appliance, or other device. The subsystem (s) or system(s) may also include any suitable processor known in the art, such as a parallel processor. In addition, the subsystem(s) or system(s) may include a platform with high-speed processing and software, either as a standalone or a networked tool.

The processor 308 and electronic data storage unit 309 may be disposed in or otherwise part of the system 300 or another device. In an example, the processor 308 and electronic data storage unit 309 may be part of a standalone control unit or in a centralized quality control unit. Multiple processors 308 or electronic data storage units 309 may be used.

The processor 308 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 308 to implement various methods and functions may be stored in readable storage media, such as a memory in the electronic data storage unit 309 or other memory.

If the system 300 includes more than one computer subsystem 302, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 308 may be configured to perform a number of functions using the output of the system 300 or other output. For instance, the processor 308 may be configured to send the output to an electronic data storage unit 309 or another storage medium. The processor 308 may be further configured as described herein. For example, the processor 308 can be used to control pumps for the fluid flow in the cooling structure 120.

The processor 308 may be communicatively coupled to any of the various components or sub-systems of system 300 in any manner known in the art. Moreover, the processor 308 may be configured to receive and/or acquire data or information from other systems (e.g., inspection results from an inspection system such as a review tool, a remote database including design data and the like) by a transmission medium that may include wired and/or wireless portions. In this manner, the transmission medium may serve as a data link between the processor 308 and other subsystems of the system 300 or systems external to system 300.

Various steps, functions, and/or operations of system 300 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 308 (or computer subsystem 302) or, alternatively, multiple processors 308 (or multiple computer subsystems 302). Moreover, different sub-systems of the system 300 may include one or more computing or logic systems. Therefore, the above description should not be interpreted as a limitation on the present disclosure but merely an illustration.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:

an electromagnetic coil;

a cooling structure surrounding the entirety of the perimeter of the electromagnetic coil, wherein the cooling structure comprises a first cooling channel and a second cooling channel arranged alternately about the electromagnetic coil, and wherein the first cooling channel and the second cooling channel are defined by separate tubing circuits wrapped around the entirety of the perimeter of the electromagnetic coil; and a cooling fluid source configured to deliver a first cooling fluid to the first cooling channel and a second cooling fluid to the second cooling channel, such that the first cooling fluid and the second cooling fluid cool the electromagnetic coil.

2. The system of claim 1, further comprising:

an electron beam source configured to generate an electron beam, wherein the electron beam is directed through an aperture of the electromagnetic coil toward a target; and a voltage source configured to power the electromagnetic coil which generates an electromagnetic field in the aperture and focuses the electron beam passing through the aperture.

3. The system of claim 1, wherein the first cooling channel and the second cooling channel are defined by separate channel circuits in an integrated solid structure surrounding the entirety of the perimeter of the electromagnetic coil.

4. The system of claim 1, wherein the electromagnetic coil has a ring shape comprising a top surface, a bottom surface, an inner surface, and an outer surface, and the cooling structure is disposed on each of the top surface, the bottom surface, the inner surface, and the outer surface.

5. The system of claim 1, wherein the first cooling channel and the second cooling channel are arranged alternately about each surface of the electromagnetic coil in a single layer.

6. The system of claim 1, wherein the cooling structure further comprises:

a first inlet and a first outlet in fluid communication with the first cooling channel; and a second inlet and a second outlet in fluid communication with the second cooling channel;

wherein the first inlet is disposed adjacent to the second outlet, and the second inlet is disposed adjacent to the first outlet.

7. The system of claim 1, wherein the first cooling fluid travels through the first cooling channel in a first direction and the second cooling fluid travels through the second cooling channel in a second direction, the second direction being opposite to the first direction.

8. The system of claim 1, wherein the cooling fluid source comprises water.

9. The system of claim 1, wherein the first cooling channel and the second cooling channel have the same cross-sectional area and effective length.

10. The system of claim 1, wherein the cooling structure encases the electromagnetic coil.

11. The system of claim 1, wherein the electromagnetic coil and the cooling structure are disposed within a housing.

12. A method comprising:

powering, via a voltage source, an electromagnetic coil; and delivering, via a cooling fluid source, a first cooling fluid and a second cooling fluid to a cooling structure surrounding the entirety of the perimeter of the electromagnetic coil;

wherein the cooling structure comprises a first cooling channel and a second cooling channel arranged alternately about the electromagnetic coil, the first cooling fluid is delivered to the first cooling channel, and the second cooling fluid is delivered to the second cooling channel, such that the first cooling fluid and the second cooling fluid uniformly cool the electromagnetic coil, wherein the first cooling channel and the second cooling channel are defined by separate tubing circuits wrapped around the entirety of the perimeter of the electromagnetic coil.

13. The method of claim 12, further comprising:

generating, via an electron beam source, an electron beam; and directing the electron beam through an aperture of the electromagnetic coil toward a target;

wherein an electromagnetic field generated by the electromagnetic coil focuses the electron beam passing through the aperture.

14. The method of claim 12, wherein the first cooling channel and the second cooling channel are defined by separate channel circuits in an integrated solid structure surrounding the entirety of the perimeter of the electromagnetic coil.

15. The method of claim 12, wherein the electromagnetic coil has a ring shape comprising a top surface, a bottom surface, an inner surface, and an outer surface, and the cooling structure is disposed on each of the top surface, the bottom surface, the inner surface, and the outer surface.

16. The method of claim 12, wherein the first cooling channel and the second cooling channel are arranged alternately about each surface of the electromagnetic coil in a single layer.

17. The method of claim 12, wherein delivering, via the cooling fluid source, the second cooling fluid and the second cooling fluid to the cooling structure comprises:

delivering, via a first inlet, the first cooling fluid to the first cooling channel, wherein the first cooling fluid exits the first cooling channel at a first outlet;

delivering, via a second inlet, the second cooling fluid to the second cooling channel, wherein the second cooling fluid exits the second cooling channel at a second outlet;

wherein the first inlet is disposed in the cooling structure adjacent to the second outlet, and the second inlet is disposed in the cooling structure adjacent to the first outlet.

18. The method of claim 12, wherein the first cooling fluid travels through the first cooling channel in a first direction and the second cooling fluid travels through the second cooling channel in a second direction, the second direction being opposite to the first direction.

* * * * *